(12) United States Patent
Furukawa et al.

(10) Patent No.: US 8,840,785 B2
(45) Date of Patent: Sep. 23, 2014

(54) SCALE DEPOSITION DEVICE AND WATER HEATER

(75) Inventors: Seiji Furukawa, Tokyo (JP); Seiji Noda, Tokyo (JP); Toshiyuki Kamiya, Tokyo (JP); Tadashi Saito, Tokyo (JP); Isamu Hirashiki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 243 days.

(21) Appl. No.: 13/146,298

(22) PCT Filed: Jan. 15, 2010

(86) PCT No.: PCT/JP2010/050416
§ 371 (c)(1),
(2), (4) Date: Jul. 26, 2011

(87) PCT Pub. No.: WO2010/092852
PCT Pub. Date: Aug. 19, 2010

(65) Prior Publication Data
US 2011/0283728 A1    Nov. 24, 2011

(30) Foreign Application Priority Data

Feb. 16, 2009   (JP) ................. 2009-032812

(51) Int. Cl.
| | |
|---|---|
| C02F 5/02 | (2006.01) |
| F24D 19/00 | (2006.01) |
| F24H 1/10 | (2006.01) |
| C02F 1/46 | (2006.01) |
| C02F 1/74 | (2006.01) |
| C02F 1/00 | (2006.01) |

(52) U.S. Cl.
CPC ............... *F24D 19/0092* (2013.01); *C02F 1/74* (2013.01); *C02F 2201/46115* (2013.01); *C02F 2201/46145* (2013.01); *F24H 1/106* (2013.01); *C02F 1/4602* (2013.01); *C02F 2201/4613* (2013.01); *C02F 2201/4619* (2013.01); *C02F 1/008* (2013.01)
USPC ........................... 210/201; 204/240; 204/276

(58) Field of Classification Search
None
See application file for complete search history.

(56) References Cited

U.S. PATENT DOCUMENTS

| | | | | |
|---|---|---|---|---|
| 4,528,252 A | * | 7/1985 | Yamazaki | ...................... 429/111 |
| 5,328,574 A | * | 7/1994 | Mercier | ........................ 205/744 |

(Continued)

FOREIGN PATENT DOCUMENTS

| | | |
|---|---|---|
| DE | 198 23 670 A1 | 11/1999 |
| EP | 1 156 014 A1 | 11/2001 |

(Continued)

OTHER PUBLICATIONS

International Search Report Issued Mar. 2, 2010 in PCT/JP10/050416 filed Jan. 15, 2010.

(Continued)

*Primary Examiner* — Harry D Wilkins, III
(74) *Attorney, Agent, or Firm* — Oblon, Spivak, McClelland, Maier & Neustadt, L.L.P.

(57) ABSTRACT

A water heater, which allows efficient deposition of a scale component dissolved in water so as to reduce adhesion of the scale to a heat-transfer channel. The water heater includes: scale deposition device including a tank, an anode and a cathode provided in the tank so as to be opposed to each other, and a first power supply for applying a voltage between the anode and the cathode, the scale deposition device depositing a scale component dissolved in water retained in the tank; a heat-transfer channel provided at downstream of the scale deposition device, for guiding the water; and a heat source for heating the water by heat exchange in the heat-transfer channel, in which the scale deposition device includes oxygen-gas supplying/dissolving means for supplying an oxygen gas to a water feed pipe for feeding the water to the tank and dissolving the oxygen gas in the water.

7 Claims, 10 Drawing Sheets

(56) References Cited

U.S. PATENT DOCUMENTS

| | | | |
|---|---|---|---|
| 5,460,702 A | * | 10/1995 | Birkbeck et al. ......... 210/748.17 |
| 5,897,765 A | * | 4/1999 | Mercier ....................... 205/743 |
| 6,547,947 B1 | | 4/2003 | Uno et al. |
| 2007/0040042 A1 | | 2/2007 | Stapensea |

FOREIGN PATENT DOCUMENTS

| JP | 47 21379 | 10/1972 |
|---|---|---|
| JP | 3 5305 | 1/1991 |
| JP | 3 170747 | 7/1991 |
| JP | 9 291801 | 11/1997 |
| JP | 2001 219166 | 8/2001 |
| JP | 2001 317817 | 11/2001 |
| JP | 2003-172531 A | 6/2003 |
| JP | 2006-95426 A | 4/2006 |
| WO | WO 92/05116 A1 | 4/1992 |

OTHER PUBLICATIONS

Extended Search Report issued Sep. 30, 2013 in European Patent Application No. 10741132.4.

Office Action issued May 21, 2013, in Japanese Patent Application No. 2010-550480 (with English-language translation).

* cited by examiner

FIG. 6

| | EXAMPLE 1 | COMPARATIVE EXAMPLE 1 |
|---|---|---|
| DISSOLVED $Ca^{2+}$ REMOVAL EFFICIENCY (%) * | 75 | 5 |
| AMOUNT OF SCALE ADHERING TO CATHODE ($mg/cm^2$) | 0.05 | 0.1 |
| pH IN VICINITY OF CATHODE | 12 | 7.2 |

EXAMPLE 1: WITH MIXTURE OF OXYGEN
(DISSOLVED-$O_2$ CONCENTRATION: 15 mg/L)

COMPARATIVE EXAMPLE 1: WITHOUT MIXTURE OF OXYGEN
(DISSOLVED-$O_2$ CONCENTRATION: 5 mg/L)

⟨COMMON CONDITIONS⟩

POTENTIAL DIFFERENCE BETWEEN ANODE AND CATHODE:12V
INTER-ELECTRODE DISTANCE 5mm
Ca CONCENTRATION OF ENTERING WATER :120mg/L
pH OF ENTERING WATER : 6.8

FIG. 8

| | EXAMPLE 2 | EXAMPLE 1 | COMPARATIVE EXAMPLE 1 |
|---|---|---|---|
| DISSOLVED $Ca^{2+}$ REMOVAL EFFICIENCY (%) * | 75 | 75 | 5 |
| AMOUNT OF SCALE ADHERING TO HEAT-TRANSFER CHANNEL ($mg/cm^2$) | 0.01 | 0.05 | 0.2 |
| AMOUNT OF SCALE ADHERING TO CATHODE ($mg/cm^2$) | 0.01 | 0.01 | 0.1 |

EXAMPLE 2: WITH MIXTURE OF OXYGEN
(DISSOLVED—$O_2$ CONCENTRATION: 15 mg/L),
PARTICLE REMOVAL EFFICIENCY 90%

EXAMPLE 1: WITH MIXTURE OF OXYGEN
(DISSOLVED-$O_2$ CONCENTRATION: 15 mg/L)
WITHOUT PARTICLE REMOVAL

COMPARATIVE EXAMPLE 1: WITHOUT MIXTURE OF OXYGEN
(DISSOLVED-$O_2$ CONCENTRATION: 5 mg/L)

⟨COMMON CONDITIONS⟩
POTENTIAL DIFFERENCE BETWEEN ANODE AND CATHODE:12v
INTER-ELECTRODE DISTANCE 5mm
Ca CONCENTRATION OF ENTERING WATER:120mg/L
pH OF ENTERING WATER : 6.8

FIG. 9

|  | EXAMPLE 3 | EXAMPLE 2 | EXAMPLE 1 |
|---|---|---|---|
| DISSOLVED $Ca^{2+}$ REMOVAL EFFICIENCY (%) * | 95 | 75 | 75 |
| AMOUNT OF SCALE ADHERING TO HEAT-TRANSFER CHANNEL (mg/cm$^2$) | 0.002 | 0.01 | 0.05 |
| AMOUNT OF SCALE ADHERING TO CATHODE (mg/cm$^2$) | 0.01 | 0.01 | 0.01 |

EXAMPLE 3: PARTICLE REMOVAL EFFICIENCY 90%, EMBODIMENT 3
EXAMPLE 2: PARTICLE REMOVAL EFFICIENCY 90%, EMBODIMENT 1
EXAMPLE 1: WITHOUT PARTICLE REMOVAL, EMBODIMENT 1

⟨COMMON CONDITIONS⟩
POTENTIAL DIFFERENCE BETWEEN ANODE AND CATHODE:12V
INTER-ELECTRODE DISTANCE 5mm
Ca CONCENTRATION OF ENTERING WATER:120mg/L
pH OF ENTERING WATER : 6.8 WITH MIXTURE OF OXYGEN
(DISSOLVED-$O_2$ CONCENTRATION: 15 mg/L)

FIG. 10

|  | EXAMPLE 4 | COMPARATIVE EXAMPLE 2 |
|---|---|---|
| DISSOLVED $Ca^{2+}$ REMOVAL EFFICIENCY (%) * | 60 | 5 |
| AMOUNT OF SCALE ADHERING TO CATHODE ($mg/cm^2$) | 0.06 | 0.1 |
| pH IN VICINITY OF CATHODE | 11.2 | 7.2 |

EXAMPLE 4: WITH MIXTURE OF AIR
 (DISSOLVED-$O_2$ CONCENTRATION: 12 mg/L)
COMPARATIVE EXAMPLE 2: WITHOUT MIXTURE OF AIR
 (DISSOLVED-$O_2$ CONCENTRATION: 5 mg/L)

⟨COMMON CONDITIONS⟩
POTENTIAL DIFFERENCE BETWEEN ANODE AND CATHODE:12V
INTER-ELECTRODE DISTANCE 5mm
Ca CONCENTRATION OF ENTERING WATER:120mg/L
pH OF ENTERING WATER : 6.8

SCALE DEPOSITION DEVICE AND WATER HEATER

TECHNICAL FIELD

The present invention relates to a scale deposition device including scale deposition means for depositing a scale component dissolved in water and a water heater using the scale deposition device.

BACKGROUND ART

Water heaters for supplying hot water at a bath room and a kitchen are roughly classified into electric water heaters, gas water heaters, oil water heaters, and the like. Any of the types of water heater includes a part called "heat exchanger" for transferring heat to water.

Among the electric water heaters, a heat-pump heat-exchange type electric water heater (heat-pump water heater) has recently attracted particular attention in view of reduction of carbon dioxide as measures to save energy and countermeasures against global warming.

The heat-pump water heater operates on the principle that heat in the atmosphere is transferred to a heat medium to heat water with the transferred heat. More specifically, the heat-pump water heater is operated by a repeated operation (cooling-heating cycle) of transferring high heat, which is generated when a gas is compressed, to water through an intermediation of the heat exchanger, and then lowering the temperature of the heat medium back to an atmospheric temperature with cool air generated when the gas is expanded. Even though a larger amount of heat energy than that of input energy cannot be obtained in theory, a larger amount of heat energy than the amount of energy required for the operation can be used because the heat-pump water heater has a mechanism of using the heat in the atmosphere.

It is very important to constantly maintain a heat-transfer surface in a clean state because the heat exchanger transfers the heat to the water. When a wall surface is stained, an effective heat-transfer area is reduced, which in turn lowers heat-transfer performance. When the stain is further accumulated, a flow channel is obstructed in the worst case.

In a region where a large amount of hardness components (calcium ions or magnesium ions) is contained in water, in particular, there is a problem in that carbonate crystal called "scale" is deposited by heating and is likely to adhere to the inner side of the heat exchanger.

As a water heater for solving the problem described above, there is known a water heater including means for generating a nucleus of a scale component, which is provided in a stage previous to the heat exchanger, during the heat exchange, in which the heat exchanger is partially formed of a base material made of copper or copper alloy, and at least a surface of the base material which may come into contact with water during use is coated (for example, see Patent Literature 1).

In the case of the water heater described above, the nucleus generation means includes a plurality of electrodes and a power supply for applying a voltage between the electrodes. A pH of water in the vicinity of a cathode is increased as a result of electrolysis of the water, and hence a nucleus of calcium carbonate crystal is generated in the vicinity of the cathode. As a result, Ca is unlikely to be brought into an oversaturated state on a surface of the heat exchanger. Therefore, an insoluble Ca compound is unlikely to be deposited.

CITATION LIST

Patent Literature

Patent Literature 1: JP 2001-317817 A

SUMMARY OF INVENTION

Technical Problems

In the above-mentioned Patent Literature 1, however, dissolved oxygen serving as an alkali source becomes insufficient when the pH in the vicinity of the cathode is increased by the electrolysis of the water so as to deposit scale particles of calcium carbonate in a solution. Therefore, there is another problem in that the scale particles are not efficiently generated.

Moreover, when oxygen serving as the alkali source becomes insufficient, the pH of an aqueous solution containing the scale particles becomes 8 or smaller. As a result, although the scale particles in the aqueous solution are charged positively, the cathode is charged negatively. Therefore, the generated scale particles in the aqueous solution are electrostatically attracted to the cathode to adhere thereto. As a result, the adhesion of scale to the cathode is developed to form a low-conductivity layer on the cathode. Thus, there is a further problem in that the nucleus generation means does not work effectively.

The present invention has been made to solve the problems described above, and has an object to provide a scale deposition device which allows efficient deposition of a scale component dissolved in water so as to reduce adhesion of the scale to a heat-transfer channel.

Further, the present invention has an object to provide a water heater which allows to reduce adhesion of the scale to a heat-transfer channel which is provided at downstream of the scale deposition device.

Solution to Problems

A scale deposition device according to the present invention includes: a tank; scale deposition means including an anode and a cathode provided so as to be opposed to each other, and a power supply for applying a voltage between the anode and the cathode, depositing a scale component dissolved in water retained in the tank, in which the scale deposition means comprises oxygen-gas supplying/dissolving means for supplying an oxygen gas to a water feed pipe for feeding the water to the tank and dissolving the oxygen gas in the water.

Further, a water heater according to the present invention includes: a scale deposition device comprising scale deposition means depositing a scale component dissolved in water retained in a tank; a heat-transfer channel provided at downstream of the scale deposition device, for guiding the water; and a heat source for heating the water by heat exchange in the heat-transfer channel.

A water heater according to the present invention includes: scale deposition means including a tank, an anode and a cathode provided in the tank so as to be opposed to each other, and a power supply for applying a voltage between the anode and the cathode, the scale deposition means depositing a scale component dissolved in water retained in the tank; a heat-transfer channel provided at downstream of the scale deposition means, for guiding the water; and a heat source for heating the water by heat exchange in the heat-transfer channel, in which the scale deposition means includes oxygen-gas supplying/dissolving means for supplying an oxygen gas to a water feed pipe for feeding the water to the tank and dissolving the oxygen gas in the water.

Advantageous Effects of Invention

According to the scale deposition device of the present invention, the scale deposition means includes the oxygen-gas supplying/dissolving means for supplying the oxygen gas to feed water and dissolving the oxygen gas therein. Therefore, a pH in the vicinity of the cathode can be increased. In the scale deposition means, scale particles are efficiently generated. In addition, the amount of scale adhering to the cathode is reduced to reduce the amount of scale adhering to the heat-transfer channel. As a result, an effect of improving heat-transfer performance is obtained.

According to the water heater of the present invention, a scale deposition device includes scale deposition means efficiently depositing a scale component. Therefore, the amount of scale adhering to the heat-transfer channel provided at downstream of the scale deposition device is reduced, an effect of improving heat-transfer performance at the heat-transfer channel is obtained.

BRIEF DESCRIPTION OF THE DRAWINGS

FIG. 6 is a diagram illustrating comparison value between Example 1 of the present invention and Comparative Example 1.

FIG. 8 is a diagram illustrating each comparison value of Example 1, Example 2 of the present invention and Comparative Example 1.

FIG. 9 is a diagram illustrating each comparison value of Example 1, Example 2, and Example 3 of the present invention.

FIG. 10 is a diagram illustrating comparison value between Example 4 of the present invention and Comparative Example 2.

DESCRIPTION OF EMBODIMENTS

Figure 1:
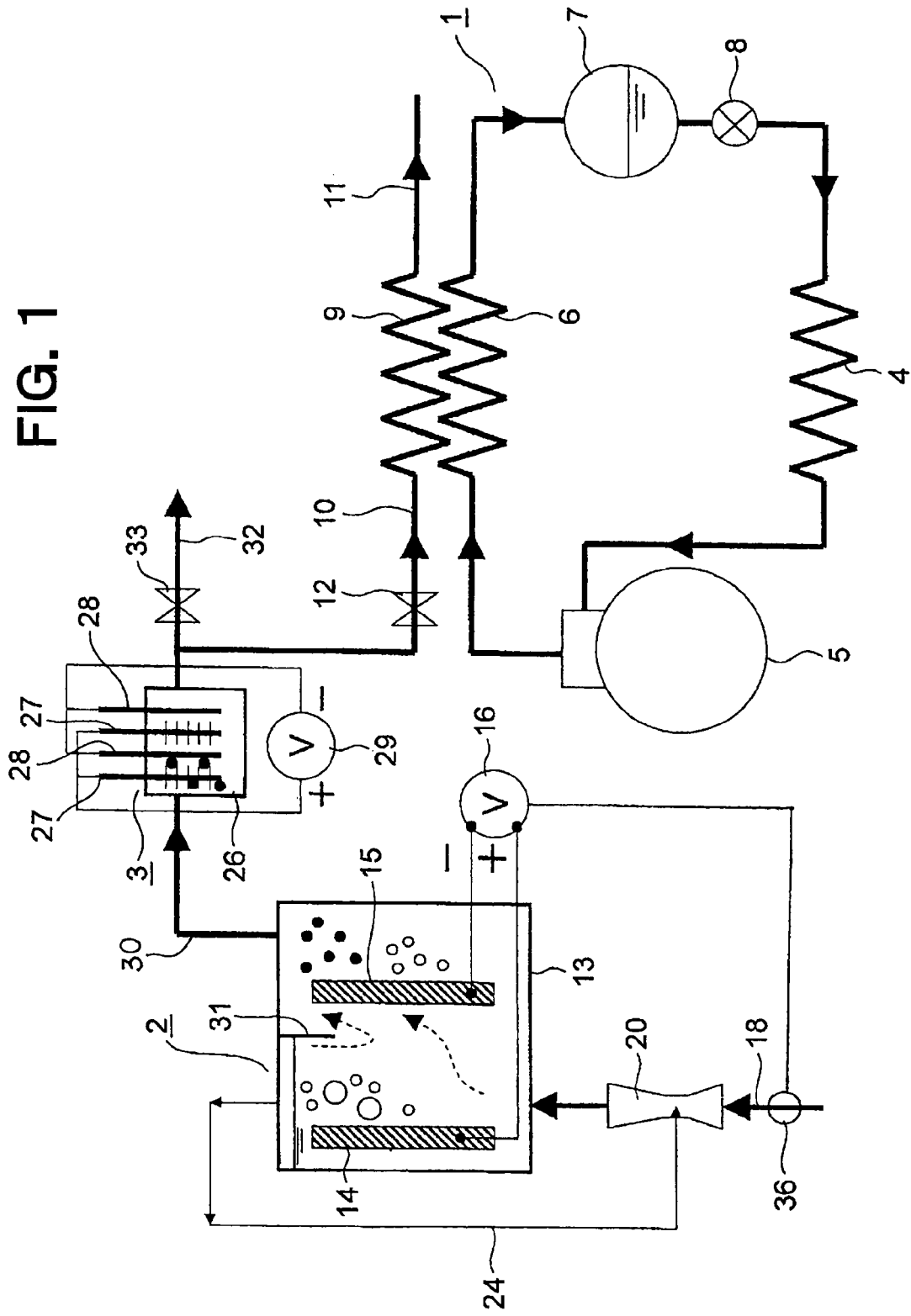
FIG. 1 is a schematic configuration diagram illustrating a water heater according to Embodiment 1 of the present invention.

Hereinafter, each of embodiments of the present invention is described with reference to the drawings. In the drawings, the same or equivalent members and parts are denoted by the same reference numerals.

Embodiment 1

FIG. 1 is a schematic configuration diagram illustrating a water heater according to Embodiment 1 of the present invention.

The water heater includes a water heater main body 1 for heating water, scale deposition device 2 for depositing a scale component contained in the water to be fed to the water heater main body 1, and scale capture means 3 for collecting the scale deposited by the scale deposition device 2.

The water heater main body 1 includes a evaporator 4 corresponding to an air-to-heat medium heat exchanger, for transferring heat of heated outside air to a heat medium, a compressor 5 for compressing the heat medium evaporated in the evaporator 4, a condenser 6 corresponding to a heat medium-to-water heat exchanger for heating water corresponding to a liquid to be heated with heat of the heat medium, which liquefies the heat medium, a liquid receiver 7 for retaining the heat medium from the condenser 6, and an expansion valve 8 for quickly adiabatically expanding the high-temperature high-pressure liquefied heat refrigerant from the liquid receiver 7. The above-mentioned components are connected sequentially to constitute a cooling-heating cycle.

The condenser 6 corresponding to a heat source is held in thermal contact with a heat-transfer channel 9 through which water flowing in parallel to the heat medium passes.

An upstream side of the heat-transfer channel 9 is connected to an inlet pipe 10 for water to be heated, to which a changeover valve 12 is mounted, whereas a downstream side of the heat-transfer channel 9 is connected to a heated-water outlet pipe 11. The water from the inlet pipe 10 for water to be heated flows into the heated-water outlet pipe 11 through the heat-transfer channel 9. While passing through the heat-transfer channel 9, the water is heated by heat exchange with the heat medium. The heated-water outlet pipe 11 is connected to tapping means (not shown) such as a water faucet or a shower.

Although the heat medium flowing through the condenser 6 and the water flowing through the heat-transfer channel 9 flow in parallel to each other in this embodiment, the heat medium and the water may counterflow, that is, flow in directions opposite to each other.

The scale deposition device 2 includes a tank 13 and scale deposition means depositing a scale component dissolved in water retained in the tank 13.

The scale deposition means includes an anode 14 and a cathode 15 which are provided in the tank 13 so as to be opposed to each other, a first power supply 16 having a positive electrode connected to the anode 14 and a negative electrode connected to the cathode 15, a partition plate 31 having a length corresponding to $1/100$ to $1/2$ of a total height of the tank 13, which is mounted to a ceiling of the tank 13 between the anode 14 and the cathode 15, and oxygen-gas supplying/dissolving means for supplying an oxygen gas in a water feed pipe 18 which feeds water to the tank 13 and dissolving the oxygen gas in the water.

The oxygen-gas supplying/dissolving means includes an ejector 20 mounted to the water feed pipe 18, and a return pipe 24 having one end portion connected to the tank 13 so as to lead to a space above the anode 14 and the other end portion connected to the ejector 20.

A flow sensor 36 corresponding to water-supply detection means is mounted to the water feed pipe 18.

The flow sensor 36 is connected to the first power supply 16. When water flows through the water feed pipe 18, the first power supply 16 is turned ON in response to an electric signal from the flow sensor 36 so as to apply a voltage between the anode 14 and the cathode 15.

The anode 14 is made of an oxidation catalyst for promoting an oxidation reaction of water on a base material. As the base material, a cloth having a density of 200 g/cm² (thickness: 300 μm), which is made of a sinter of a titanium (Ti)

metal fiber (sinter obtained by weaving a single fiber having a fiber diameter of 20 μm and a length of 50 to 100 mm), or an expanded metal made of titanium having a network structure is used. By plating the base material with platinum (Pt) or iridium oxide ($IrO_2$) serving as a catalyst at a density of 0.25 to 2 mg/cm$^2$, the cathode 14 is formed.

The oxidation reaction of water develops only on the anode 14. Therefore, when the expanded metal is used as the base material, the density of the network affects an area of a reaction surface. Specifically, it is preferred to use the expanded metal having ten or more holes per inch.

On the other hand, as the cathode 15, molybdenum, stainless steel, aluminum, copper, iron, or tungsten is used. Alternatively, an electrode made of a carbon-based base material which promotes a reduction reaction of oxygen and a reduction catalyst which promotes the reduction reaction of oxygen may be used. As the carbon-based base material, for example, a carbon fiber having a thickness of 200 μm (having a fiber diameter of about 5 to 50 μm and a porosity of 50 to 80%) is used. It is desirable that the carbon fiber be subjected to water-repellent treatment with a fluorine gas.

It is preferred to form the tank 13 of a resin material such as vinyl chloride or acrylic, or a metal material such as stainless steel or aluminum.

The size of the scale deposition device 2 cannot be uniquely determined because the size varies according to a flow rate of pour water. Specifically, it is desired to increase an energizing current, the volume of the tank 13, and the surface areas of the anode 14 and the cathode 15 in proportion to the flow rate of the pour water.

On the other hand, characteristics of the current with respect to the applied voltage vary depending on form factors such as an inter-electrode distance between the anode 14 and the cathode 15 and the electrode areas of the anode 14 and the cathode 15, and the water quality (conductivity) of a medium present between the electrodes.

Desirably, it is preferred to design the inter-electrode distance in the range of 1 mm to 40 mm.

The inter-electrode distance of 1 mm or less is not efficient because the reaction occurring in the vicinity of the cathode 15 and the reaction occurring in the vicinity of the anode 14 interfere with each other.

On the other hand, usual running water has water quality with a low conductivity. Therefore, when the inter-electrode distance is 40 mm or larger, a voltage equal to or higher than 40 V is required to obtain necessary treatment performance. The voltage equal to or higher than 40 V is not desirable in practice because the metal material used for the anode 14 is severely corroded.

Figure 2:
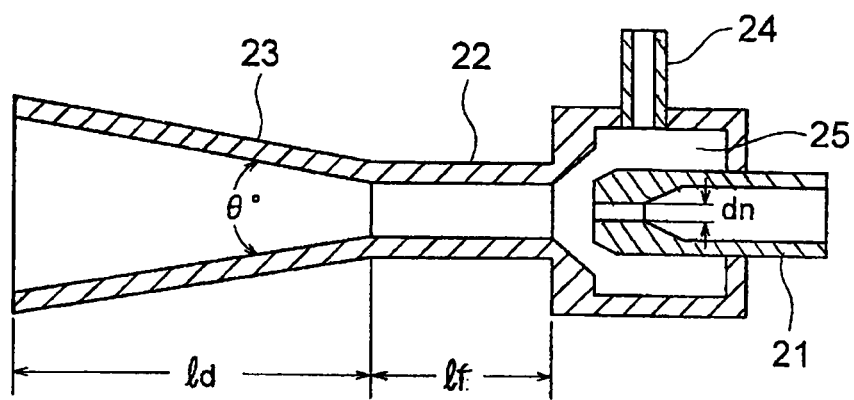
FIG. 2 is a vertical cross-sectional view illustrating an ejector of FIG. 1.

The ejector 20 is a water-jet air-extractor type, and includes a nozzle 21, a throat 22, and a diffuser 23 as illustrated in FIG. 2. As an example, it is desirable to design the ejector 20 in the range of: $I_f$=2 to 100 mm, $I_d$=10 to 200 mm, $d_n$=1.0 to 10 mm, and O=10 to 30 degrees.

The return pipe 24 having one end portion leading to a mixing chamber 25 is connected to the ejector 20. The other end portion of the return pipe 24 is connected to an upper surface of the tank 13 so as to lead to the space above the anode 14.

In the ejector 20, when water flows from the water feed pipe 18 into the tank 13 by driving a pump (not shown), the oxygen gas in the upper space of the tank 13 flows into the mixing chamber 25 through the return pipe 24 to be dissolved in water. As a result, a concentration of dissolved oxygen in the water to be fed to the tank 13 is increased.

The scale capture means 3 includes a tank 26, anodes 27 and cathodes 28, which are provided in the tank 26 so as to be opposed to each other, and a second power supply 29 having a positive electrode connected to the anodes 27 and a negative electrode connected to the cathodes 28. One or more pair(s) of the anode 27 and the cathode 28 is/are provided so that the anode 27 and the cathode 28 are arranged alternately.

A surface of each of the anodes 27 and the cathodes 28 is formed to have, for example, a needle-like or brush-like form. In this manner, an electric field intensity on the surfaces of the anodes 27 and the cathodes 28 suddenly increases to increase a specific surface area. Accordingly, the scale particles can be efficiently captured.

It is desirable to set a distance between the anode 27 and the cathode 28 opposed to each other to 0.15 mm to 10 mm. This value is set so that the electric field intensity at the anode 27 and the cathode 28 becomes 4 kV/cm or higher.

It is found that the electric field intensity does not change even when the distance between the anodes 27 and that between the cathodes 28 are reduced if the distance between the anode 27 and the cathode 28 is 0.15 mm or less. On the other hand, an excessive reduction of the distance is not desirable because a space between the anode 27 and the cathode 28 is easily closed with the captured scale particles. If the distance between the anode 27 and the cathode 28 opposed to each other is set to 10 mm or larger, the electric field intensity at the anode 27 and the cathode 28 becomes 4 kV/cm or less. Accordingly, the scale particles cannot be efficiently captured.

For the anodes 27 and the cathodes 28, an easily anodically oxidizable metal, for example, molybdenum, stainless steel, aluminum, copper, iron, and tungsten are used. By using the above-mentioned metals, scale layers formed on the anodes 27 and the cathodes 28 can be easily peeled off with the dissolution of the anodes 27 and the cathodes 28.

A scale removal pipe 32, which includes a changeover valve 33 provided in the middle thereof, branches from the inlet pipe 10 for water to be heated connected to the tank 26.

In the water heater having the above-mentioned configuration, water flows into the tank 13 of the scale deposition device 2 through the water feed pipe 18. The water flowing from below the anode 14 then flows from the anode 14 toward the cathode 15 and is drained from above the cathode 15 through a water outlet pipe 30.

In the tank 13, when a voltage equal to or larger than 1.2 V is applied by the first power supply 16, water ionization occurs on the anode 14 side to generate oxygen, as expressed by the following Formula (1).

$$H_2O \rightarrow 2H^+ + 1/2O_2 + 2e^- \quad (1)$$

On the cathode 15 side, OH$^-$ ions are generated by a reaction among oxygen, hydrogen ions, and electrons, as expressed by the following Formula (2).

$$2H^+ + O_2 + 2e^- \rightarrow 2OH^- \quad (2)$$

As a result of the generation of OH$^-$ ions by the reduction reaction of oxygen, the pH in the vicinity of the cathode 15 is increased.

As a result, on the cathode 15 side, Ca ions and HCO$_3$ ions dissolved in the water react with each other to generate nuclei of calcium carbonate, as expressed by the following Formula (3).

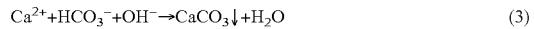

$$Ca^{2+} + HCO_3^- + OH^- \rightarrow CaCO_3 \downarrow + H_2O \quad (3)$$

Simultaneously with the flow of water through the water feed pipe 18, the first power supply 16 is turned ON in response to the electric signal from the flow sensor 36. As a result, the voltage is applied between the anode 14 and the cathode 15.

On the other hand, when calcium carbonate generated in the vicinity of the cathode 15 reaches the vicinity of the anode 14, calcium carbonate is dissolved again by $H^+$ generated as expressed by Formula (1) described above.

Therefore, the positions of the inlet and the outlet of water and the structure of the tank 13 in the scale deposition device 2 are designed so that water flows uniformly from the anode 14 to the cathode 15 as indicated by arrows in dotted lines illustrated in FIG. 1.

The oxygen gas accumulated on the anode 14 side is prevented by the partition plate 31 from leaking out along the ceiling of the tank 13 toward the cathode 15.

Along with the driving of the pump for introducing water, the oxygen gas in the upper space of the tank 13 comes to be mixed in the water flowing through the water feed pipe 18 through the return pipe 24 and the ejector 20. As a result, the water having a high concentration of dissolved oxygen is fed to the anode 14 side.

In the vicinity of the water outlet of the tank 13 of the scale deposition device 2, acid water generated in the vicinity of the anode 14 and alkaline water containing $CaCO_3$, which is generated in the vicinity of the cathode 15, mix with each other to be neutralized.

If a retention time of water in the water outlet pipe 30 between the scale deposition device 2 and the scale capture means 3 is long, there is a fear in that the scale particles containing $CaCO_3$, which is generated by the scale deposition device 2, as a major component may be dissolved again.

Specifically, it is desired to design the water outlet pipe 30 led from the ceiling of the tank 13 on the cathode 15 so that the retention time becomes 10 seconds or less when a diameter of each of the generated scale particles is 1 μm or larger and 3 seconds or less when the diameter is 10 nm to 1 μm.

Thereafter, the water containing the scale particles is drained from above the cathode 15 through the water outlet pipe 30 to be delivered to the scale capture means 3.

In the scale capture means 3, an electric field is formed between the anodes 27 and the cathodes 28 by the application of the voltage with the second power supply 29. Thus, the charged scale particles are attracted to the anodes 27 or the cathodes 28, which have charges of the opposite polarity.

A migration rate of the scale particles having a given amount of charges is governed by an electric field density.

Each of the used cathodes 28 and anodes 27 has large concavity and convexity on the surface, for example, a needle-like or brush-like surface. Therefore, the electric field intensity at the distal end of each of the anodes 27 and the cathodes 28 rapidly increases to increase the specific surface area. Thus, the scale particles can be efficiently captured.

Next, the water, from which the scale is removed by the scale capture means 3, flows through the inlet pipe 10 for water to be heated into the heat-transfer channel 9 where the water is heated with the heat from the condenser 6 corresponding to the heat source. The heated water is delivered to the tapping means (not shown) such as the water faucet or the shower.

Capture performance is lowered if the scale captured by the scale capture means 3 is not regularly removed. Specifically, each increase of 0.1 mm in average value of a thickness of the scale adhering to the surfaces of the anodes 27 and the cathodes 28 lowers the capture performance by 10% as compared to that before the increase occurs. In other words, supposing that an initial capture efficiency with no scale adhesion is 100%, an increase of 0.1 mm lowers the capture efficiency to 90%, an increase of 0.2 mm to 80%, and an increase of 0.3 mm to 72%.

This reduction in capture efficiency is due to a reduction in area where a high electric field can be formed if the anodes 27 and the cathodes 28 are covered with the scale because the scale itself has a low conductivity.

Accordingly, the scale captured by the scale capture means 3 is required to be regularly removed.

For the removal of the scale, the changeover valve 12 of the inlet pipe 10 for water to be heated is closed, whereas the changeover valve 33 of the scale removal pipe 32 is opened.

Next, an electric potential opposite to that applied at the time of the capture of the scale particles is applied to the anodes 27 and the cathodes 28. As a result, a force for attracting the scale toward the cathodes 28 opposed to the anodes 27 is exerted after the scale accumulated in a layered manner is temporarily peeled off from the anodes 27. However, the scale spontaneously settles out to be separated before being captured by the cathodes 28 because of a large weight of the scale.

In view of the separation of the scale from the anodes 27 by the spontaneous settling, it is desired to perform a removal operation by the application of the opposite potential when the average value of the thickness of the scale is in the range of 0.1 to 10 mm.

When the average value of the thickness of the scale layer is 0.1 mm or less, the re-adhesion to the anodes 27 and the cathodes 28 occurs during the removal operation because of a small weight of the scale layer. Therefore, removal efficiency is significantly lowered.

On the other hand, if the scale layer develops to the thickness of 10 mm, not only the capture efficiency is lowered to 30% but also there is a fear in that the spaces between the anodes 27 and the cathodes 28 may be closed.

As described above, according to the water heater of this embodiment, the scale deposition device 2 includes the tank 13 and the scale deposition means depositing a scale component dissolved in water retained in the tank 13, the scale deposition means includes oxygen-gas supplying/dissolving means for supplying the oxygen gas in the water feed pipe 18 which feeds water to the tank 13 and dissolving the oxygen gas in the water. Therefore, the pH of water can be increased without insufficiency of the oxygen gas serving as the alkali source in the vicinity of the cathode 15. Thus, the scale component containing calcium carbonate as a major component can be efficiently deposited.

Moreover, the vicinity of the cathode 15 at which the scale is generated is alkaline. Therefore, the scale particles are negatively charged and therefore are prevented from adhering to the cathode 15.

Further, the oxygen-gas supplying/dissolving means includes the ejector 20 mounted to the water feed pipe 18, and the return pipe 24 having the one end portion connected to the tank 13 so as to lead to the space above the anode 14 and the other end portion connected to the ejector 20. The oxygen gas generated at the anode 14 by the application of the voltage is sucked into the ejector 20 through the return pipe 24 so as to be dissolved in the water. Therefore, the efforts to supply the oxygen gas from outside are not needed.

Further, the dissolution of the oxygen gas in the water uses the effect of the ejector 20 for sucking the water flowing through the water feed pipe 18. Therefore, the oxygen gas is easily and efficiently dissolved in the water.

Further, the partition plate for preventing the oxygen gas from flowing from the anode 14 side along the ceiling toward the cathode 15 is provided to the ceiling of the tank 13 between the anode 14 and the cathode 15. Therefore, the oxygen gas generated at the anode 14 by the electrolysis of water is collected through the return pipe 24 and the ejector 20. As a result, collection efficiency is improved.

Further, the water feed pipe 18 and the water outlet pipe 30 are connected to the tank 13 so that the water flows from the anode 14 to the cathode 15. Therefore, the scale generated in the vicinity of the cathode 15 is prevented from flowing toward the anode 14 so as not to dissolve the scale components deposited in the vicinity of the anode 14 again.

Further, the scale capture means 3 is provided at the downstream of the scale deposition device 2. The water from which the scale components are removed by the scale capture means 3 is guided to the heat-transfer channel 9. Thus, the amount of adhesion of the scale on the heat-transfer channel 9 is reduced to improve heat-transfer performance of the water heater main body 1 from the condenser 6.

Further, the flow sensor 36 is mounted to the water feed pipe 18. By the flow sensor 36, the scale deposition device 2 is constantly operated only while water is being fed to the tank 13 and is not operated when water is not fed.

Therefore, the occurrence of the following state can be prevented. The oxygen gas serving as the alkali source becomes insufficient. In the vicinity of the cathode 15, the pH of the aqueous solution containing the scale particles becomes 8 or less. As a result, the scale particles in the aqueous solution are positively charged, and hence the scale particles generated in the aqueous solution are electrostatically attracted to the cathode 15 to cover the cathode 15. As a result, a high electric field is not formed in the vicinity of the cathode 15 to prevent the scale from being deposited.

Embodiment 2

Figure 3:
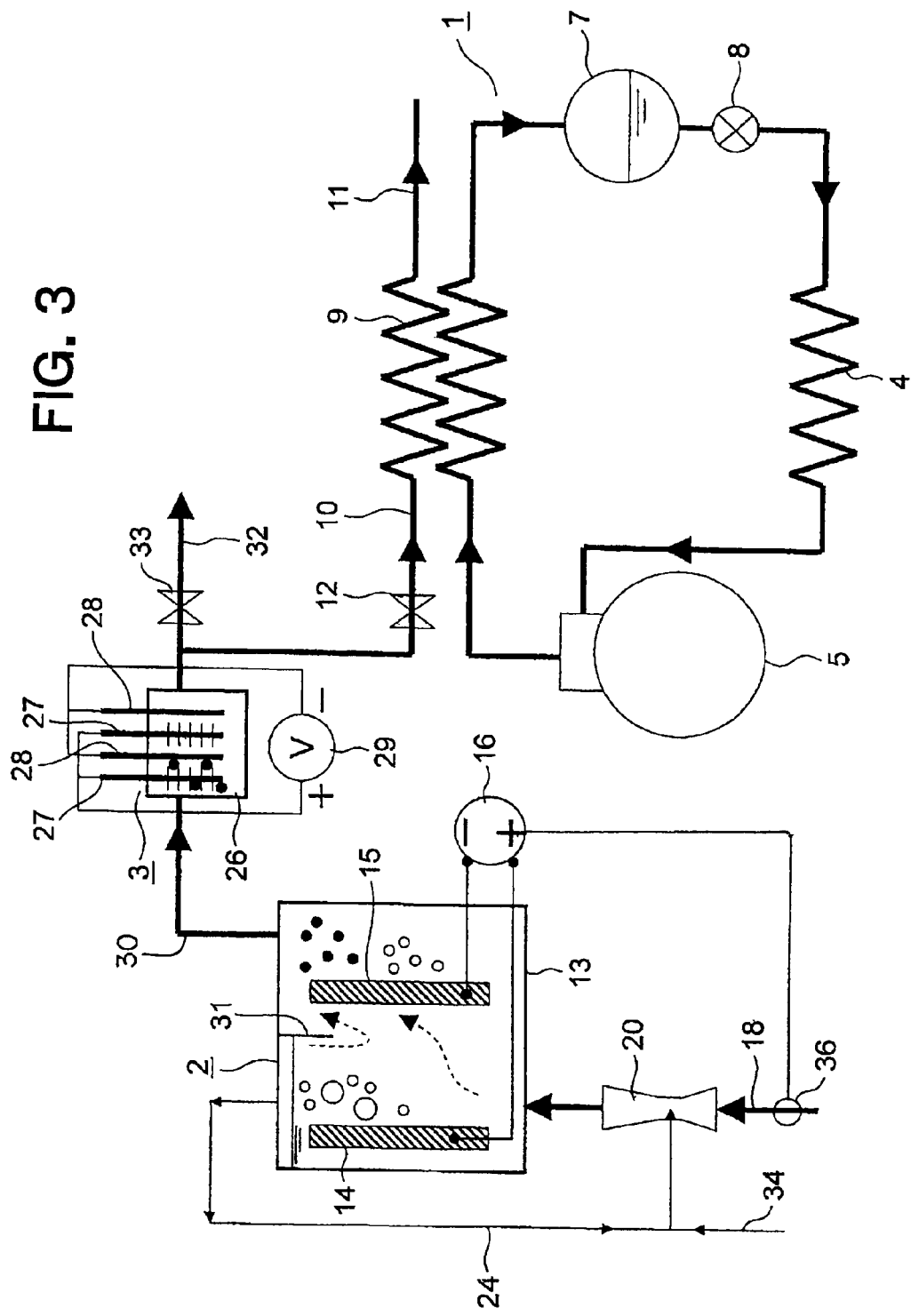
FIG. 3 is a schematic configuration diagram illustrating a water heater according to Embodiment 2 of the present invention.

FIG. 3 is a schematic configuration diagram illustrating a water heater according to Embodiment 2 of the present invention.

In Embodiment 2, a first air supply pipe 34 is connected to the return pipe 24 so that oxygen to be supplied to the ejector 20 is supplied from the first air supply pipe 34 as well as from the tank 13. As a result, the concentration of oxygen dissolved in the water is further increased as compared to that of Embodiment 1. In addition, the oxygen gas corresponding to the alkali source can be reliably supplied to the water to be fed to the tank 13.

The remaining configuration, functions, and effects are the same as those of Embodiment 1.

Embodiment 3

Figure 4:
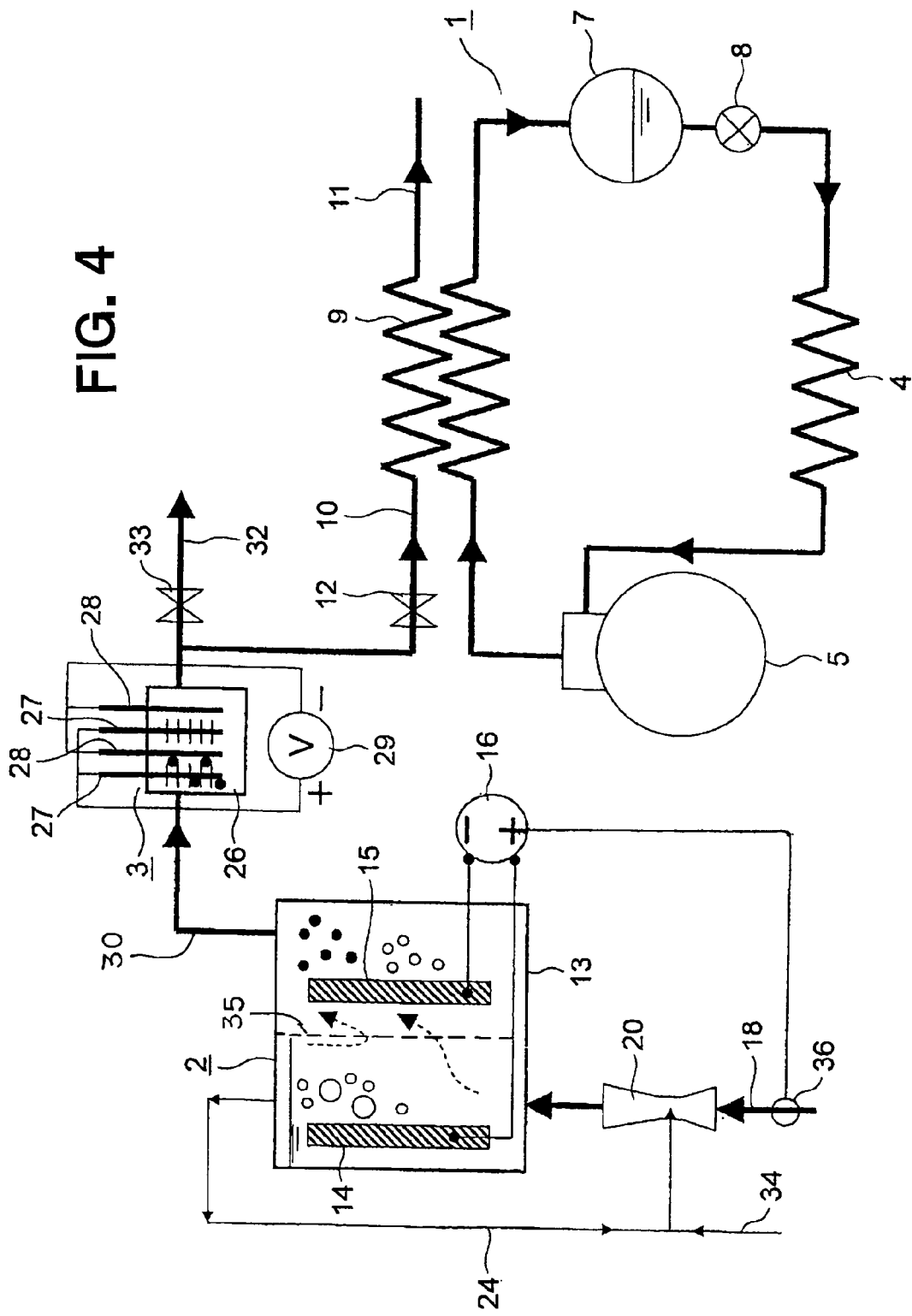
FIG. 4 is a schematic configuration diagram illustrating a water heater according to Embodiment 3 of the present invention.

FIG. 4 is a schematic configuration diagram illustrating a water heater according to Embodiment 3 of the present invention.

In Embodiment 3, a separating membrane 35 for separating the anode 14 and the cathode 15 from each other, which blocks the passage of the oxygen gas and allows the passage of water and hydrogen ions, is provided to the scale deposition device 2.

As the separating membrane 35, a proton-conducting ion-exchange membrane, an anion-conducting ion-exchange membrane, a porous organic film, a porous inorganic film, and the like are used.

Specifically, a perfluorosulfonic acid membrane can be used as the separating membrane 35. Any material, which does not permeate a gas, has electric insulating properties, and conducts only a moisture and hydrogen ions, may be used. In addition to the above-mentioned membranes, a polybenzimidazole-based ion-exchange membrane, a polybenzoxazole-based ion-exchange membrane, a polyarylene ether-based ion-exchange membrane, and the like may be used.

At this time, if phosphoric acid molecules about twice to six times as large in number as molecules of water contained in a polyelectrolyte membrane are added, a hydrogen-ion conductivity is increased to improve efficiency of depositing the scale particles.

In comparison to the water heaters of Embodiments 1 and 2 without having the separating membrane 35, the reaction occurring in the vicinity of the cathode 15 and the reaction occurring in the vicinity of the anode 14 do not interfere with each other in the water heater of Embodiment 3. Therefore, the water heater is advantageous in that the range of setting of the inter-electrode distance is large to eliminate the need of control for water flowing in the vicinity of the electrodes.

The remaining configuration, functions, and effects are the same as those of Embodiment 1.

Although the example where the Ca ions are dissolved in the water as a generated component of the scale has been described in Embodiments 1 to 3 described above, the present invention is also applicable to the case where Mg ions corresponding to a hardness component as well as the Ca ions are dissolved in water.

Further, although the flow sensor 36 has been described as the water-supply detection means, it is apparent that the water-supply detection means is not limited thereto and may be, for example, a pressure sensor.

Embodiment 4

Figure 5:
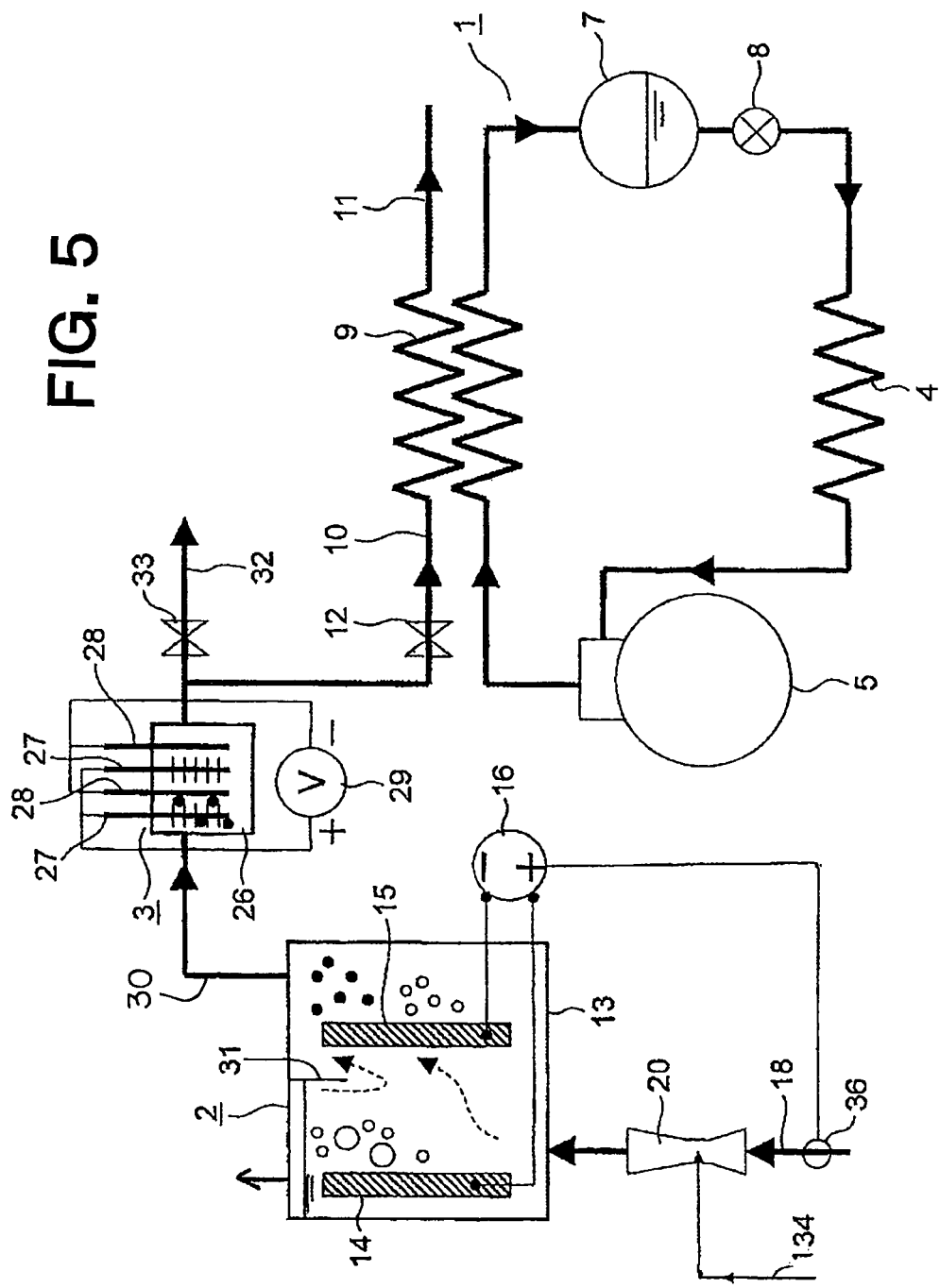
FIG. 5 is a schematic configuration diagram illustrating a water heater according to Embodiment 4 of the present invention.

FIG. 5 is a schematic configuration diagram illustrating a water heater according to Embodiment 4 of the present invention.

In this Embodiment 4, a distal end portion of a second air supply pipe 134 is connected to the ejector 20. An opening at the distal end of the second air supply pipe 134 leads to the mixing chamber 25 of the ejector 20.

In this embodiment, the return pipe 24 for supplying the oxygen gas to the ejector 20, which has been described in Embodiments 1 to 3, is not provided.

However, when the water flows from the water feed pipe 18 into the tank 13 by the driving of the pump, a pressure in the mixing chamber 25 included in the ejector 20 is reduced. As a result, air corresponding to outside air is sucked into the mixing chamber 25 through the second air supply pipe 134 to be dissolved in the water. Therefore, the concentration of oxygen dissolved in the water to be supplied to the tank 13 becomes higher.

If the amount of supply of the oxygen gas is required to be increased, it is sufficient to mount an air pump to the second air supply pipe 134. By mounting the air pump, a difference between a pressure in the second air supply pipe 134 at the downstream of the air pump and the pressure in the mixing chamber 25 can be further increased. As a result, a correspondingly larger amount of air, that is, the oxygen gas, can be mixed in the water.

In this embodiment, it is not necessary to pressurize the air to be supplied through the second air supply pipe 134. The oxygen gas contained in the inexhaustible air which is sucked by a suction pressure generated by the passage of the water through the ejector 20 is used. Moreover, the oxygen gas is easily and efficiently dissolved in the water in the mixing chamber 25 of the ejector 20.

The remaining configuration, functions, and effects are the same as those of Embodiment 1.

EXAMPLES

Next, specific examples of the effect of preventing the scale from adhering to the heat-transfer channel 9 of the water heater main body 1 in the water heaters according to Embodiments 1 to 4 described above are described.

Example 1

In Example 1, the performance of the water heater according to Embodiment 1 in the case where only the scale deposition device 2 was operated and the operation of the scale capture means 3 was stopped was examined. Specifically, for the operation, the second power supply 29 was turned OFF, whereas only the first power supply 16 was turned ON.

As setting conditions for the scale deposition device 2, an electrode area of 1 $dm^2$, a flow rate of 100 ml/L, a voltage of 12 V, and an inter-electrode distance of 5 mm were set. The tank 13 having a volume of 0.5 L and the ejector 20 with $l_f$=2 mm, $l_d$=10 mm, $d_n1$=0.1 mm, and θ=15 degrees were used. The oxygen gas generated at the anode 14 was mixed into the water through the return pipe 24 and the ejector 20.

Then, when a DC voltage was applied, a current at 1.0 A steadily flowed.

The water having a $Ca^{2+}$ concentration of 120 mg/L, the pH of 6.8, and the dissolved-oxygen concentration of 5 mg/L was used.

The ejector 20 was used to mix the oxygen gas generated at the anode 14 in the water feed pipe 18 provided before the tank 13. As a result, the dissolved-oxygen concentration increased from 5 mg/L to 15 mg/L in a steady state.

The scale capture means 3 having an electrode area of 1 $dm^2$, a flow rate of 100 ml/L, a voltage of 0 V, and an inter-electrode distance of 5 mm, which included two sets of the anode 27 and the cathode 28 provided in parallel, was used for the experiment. A volume of the tank 26 was 0.5 L.

The above-mentioned conditions are merely an example of control factors for specifically describing Examples of Embodiment 1, and do not limit operation conditions for operating Embodiment 1.

The results of Example 1 described above are shown in FIG. 6.

By applying the DC voltage of 12 V, the dissolved-$Ca^{2+}$ concentration was reduced by 75%, that is, from 120 mg/L to 30 mg/L. This reduction is attributed to the deposition of the scale particles containing the Ca ions as a major component in the vicinity of the cathode 15. The aqueous solution in the vicinity of the cathode 15 was obtained to measure the pH. As a result, the pH was 12, and therefore the aqueous solution was strongly alkaline.

On the other hand, the results obtained in the case where oxygen dissolution by the ejector 20 was stopped are shown as Comparative Example 1. Performance of removal of $Ca^{2+}$ was as low as only 5% (dissolution performance: reduction from 120 to 114 mg/L). The aqueous solution in the vicinity of the cathode 15 was obtained to measure the pH. As a result, the pH was 7.2, and therefore the aqueous solution was substantially neutral.

Further, the amount of scale adhering to the cathode 15 per unit electrode area was measured after the scale deposition device 2 was continuously operated for 1,000 hours. Then, the amount of scale was 0.01 mg/$cm^2$ in Example 1, whereas the amount of adhering scale was 0.1 mg/$cm^2$ in Comparative Example 1.

Moreover, a zeta potential was measured for the scale particles generated by the scale deposition device 2. When a different phase (for example, the electrode or colloidal particles) comes into contact with the solution, charge separation occurs at an interface of the contact. As a result, an electric double layer is formed to generate a potential difference. When the phase held in contact with the solution moves relatively, the solution present in a layer located at a given distance from a surface of the contact phase moves with the contact phase because the solution is viscous. A potential difference between a surface of the layer (sliding surface) and the part of the solution, which is sufficiently separated away from the interface, is called "zeta potential". When the zeta potential of the scale particles is positive, the scale particles are electrostatically attracted to the cathode 15. When the zeta potential is negative, the scale particles are repelled by the cathode 15.

Figure 7:
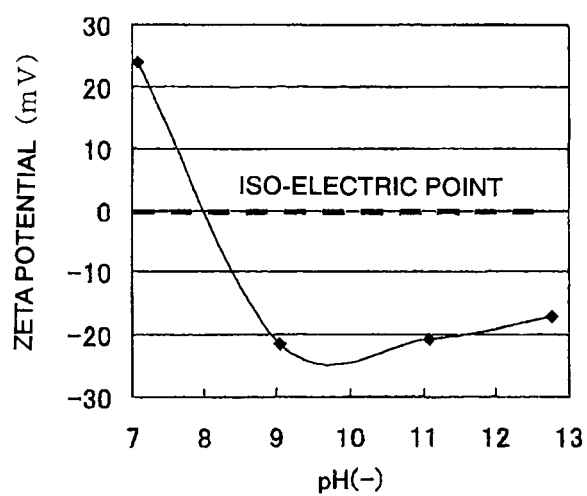
FIG. 7 is a diagram illustrating relation between the ph and the zeta potential in the Example 1 of the present invention.

The results of measurement of a change in zeta potential of the scale particles (mean particle diameter: 2.5 μm) according to the pH of the aqueous solution are shown in FIG. 7.

The zeta potential was positive at about +25 mV with the water pH of 6.8. However, the zeta potential was reduced with an increase in pH, and became approximately zero when the pH is 8 (iso-electric point). With the pH>8, the zeta potential was further reduced to exhibit −18 to −22 mV.

Specifically, the following description can be given. The aqueous solution became alkaline as a result of an increase in dissolved-oxygen concentration in Example 1 where the oxygen dissolution was carried out by the ejector 20. Therefore, the pH was within the range which allowed the scale particles to be negatively charged. Accordingly, the adhesion to the cathode 15 was prevented.

On the other hand, in Comparative Example 1, the following is considered. The dissolved-oxygen concentration was insufficient, and therefore the amount of $OH^-$ which allowed the generation of only a small amount of scale particles was only generated in the vicinity of the cathode 15. Accordingly, the pH became less than 8 and the particles were gradually deposited on the cathode 15.

Example 2

In Example 2, the performance of the water heater according to Embodiment 1 described above in the case where both the scale deposition device 2 and the scale capture means 3 were operated was examined. Specifically, for the operation, the first power supply 16 and the second power supply 29 were both turned ON.

As setting conditions for the scale deposition device 2, an electrode area of 1 $dm^2$, a flow rate of 100 ml/L, a voltage of 12 V, and an inter-electrode distance of 5 mm were set. The tank 13 having a volume of 0.5 L and the ejector with $l_f$=2 mm, $l_d$=10 mm, $d_n$=0.1 mm, and θ=15 degrees were used. The oxygen gas generated at the anode 14 was mixed before the tank 13. When a DC voltage was applied to the anode 14 and the cathode 15, a current at 1.0 A steadily flowed.

The water having a $Ca^{2+}$ concentration of 120 mg/L, the pH of 6.8, and the dissolved-oxygen concentration of 5 mg/L was used.

The ejector 20 was used to mix the oxygen gas generated at the anode 14 before the tank 13. As a result, the dissolved-oxygen concentration increased from 5 mg/L to 15 mg/L in a steady state.

The scale capture means 3 having an electrode area of 1 $dm^2$, a flow rate of 100 ml/L, and an inter-electrode distance of 5 mm, which included two sets of the anode 27 and the cathode 28 provided in parallel, was used for the experiment.

A volume of the tank 26 was 0.5 L. Based on the idea described in Embodiment 1, the power supply 29 was controlled so that the electric field intensity of the electrodes became 5 kV/cm.

The results of Example 2 are shown in FIG. 8.

By applying the DC voltage of 12 V, the dissolved-$Ca^{2+}$ concentration was reduced by 75%, that is, from 120 mg/L to 30 mg/L. This reduction is attributed to the deposition of the scale particles containing the Ca ions as a major component in the vicinity of the cathode 15.

Further, the amount of scale adhering to the cathode 15 per unit electrode area was measured after the scale deposition device 2 was continuously operated for 1,000 hours. Then, the amount of scale was 0.01 mg/cm$^2$ in Example 1, whereas the amount of scale was 0.01 mg/cm$^2$ in Example 2, which was equal to the amount in Example 1.

The amounts of scale adhering to the heat-transfer channel 9 of the water heater main body 1 provided in the subsequent stage to the scale capture means 3 were compared to each other. As a result, the amount of scale was 0.05 mg/cm$^2$ in Example 1, whereas the amount of scale was greatly reduced to 0.01 mg/cm$^2$ in Example 2.

It is considered that 90% of the scale particles was removed by the scale capture means 3, and hence the scale particles adhering to the heat-transfer channel 9 provided in the subsequent stage were reduced.

Example 3

In Example 3, the performance of the water heater according to Embodiment 3 in the case where both the scale deposition device 2 using the separating membrane 35 made of a perfluorosulfonic acid membrane and the scale capture means 3 were operated was examined. Specifically, for the operation, the first power supply 16 and the second power supply 29 were both turned ON.

As setting conditions for the scale deposition device 2, an electrode area of 1 dm$^2$, a flow rate of 100 ml/L, a voltage of 12 V, and an inter-electrode distance of 5 mm were set. The tank 13 having a volume of 0.5 L and the ejector 20 with $l_t$=2 mm, $l_d$=10 mm, $d_n$=0.1 mm, and θ=15 degrees were used. The oxygen gas generated at the anode 14 was mixed before the tank 26. When a DC voltage was applied, a current at 1.0 A steadily flowed.

The water having a $Ca^{2+}$ concentration of 120 mg/L, the pH of 6.8, and the dissolved-oxygen concentration of 5 mg/L was used.

The ejector 20 was used to mix the oxygen gas generated at the anode 14 before the tank 13. As a result, the dissolved-oxygen concentration increased from 5 mg/L to 15 mg/L in a steady state.

The scale capture means 3 having an electrode area of 1 dm$^2$, a flow rate of 100 ml/L, and an inter-electrode distance of 5 mm, which included two sets of the anode 27 and the cathode 28 provided in parallel, was used for the experiment. A volume of the tank 13 was 0.5 L. Based on the idea described in Embodiment 1, the second power supply 29 was controlled so that the electric field intensity of the electrodes became 5 kV/cm.

The results of Example 3 are shown in FIG. 9.

By applying the DC voltage of 12 V, the dissolved-$Ca^{2+}$ concentration was reduced by 95%, that is, from 120 mg/L to 6 mg/L. This reduction is attributed to the efficient deposition of the scale particles containing the Ca ions as a major component in the vicinity of the cathode 15 with no interference between the reaction occurring in the vicinity of the cathode 15 and the reaction occurring in the vicinity of the anode 14.

Further, the amount of scale adhering to the cathode 15 per unit electrode area was measured after the scale deposition device 2 was continuously operated for 1,000 hours. Then, the amount of scale was 0.01 mg/cm$^2$ in Example 2, whereas the amount of scale was 0.01 mg/cm$^2$ in Example 3, which was equal to the amount in Example 2.

The amounts of scale adhering to the heat-transfer channel 9 provided in the subsequent stage to the scale capture means 3 were compared to each other. As a result, the amount of scale was 0.01 mg/cm$^2$ in Example 2, whereas the amount of scale was greatly reduced to 0.002 mg/cm$^2$ in Example 3. It is considered that a large part of the dissolved $Ca^{2+}$ was successfully deposited as particles by the scale deposition device 2 and 90% of the scale particles was removed by the scale capture means 3 provided in the subsequent stage, and hence the scale particles adhering to the heat-transfer channel 9 provided in the subsequent stage were reduced.

Example 4

In Example 4, the performance of the water heater according to Embodiment 4 in the case where only the scale deposition device 2 was operated and the operation of the scale capture means 3 was stopped was examined.

Specifically, for the operation, the second power supply 29 was turned OFF, whereas only the first power supply 16 was turned ON.

As setting conditions for the scale deposition device 2, an electrode area of 1 dm$^2$, a flow rate of 100 ml/L, a voltage of 12 V, and an inter-electrode distance of 5 mm were set. The tank 13 having a volume of 0.5 L and the ejector 20 with $l_t$=2 mm, $l_d$=10 mm, $d_n$=0.1 mm, and θ=15 degrees were used. Oxygen contained in the air was mixed into the water through the return pipe 24 and the ejector 20. Then, when a DC voltage was applied, a current at 1.0 A steadily flowed.

The water having a $Ca^{2+}$ concentration of 120 mg/L, the pH of 6.8, and the dissolved-oxygen concentration of 5 mg/L was used.

The air pump was used to adjust the air pressure so that the oxygen gas contained in the air was mixed in the ejector 20 provided before the tank 13. As a result, the dissolved-oxygen concentration increased from 5 mg/L to 12 mg/L in a steady state.

The scale capture means 3 having an electrode area of 1 dm$^2$, a flow rate of 100 ml/L, a voltage of 0 V, and an inter-electrode distance of 5 mm, which included two sets of the anode 27 and the cathode 28 provided in parallel, was used for the experiment. A volume of the tank 26 was 0.5 L.

The above-mentioned conditions are merely an example of control factors for specifically describing Examples of Embodiment 4, and do not limit operation conditions for operating Embodiment 4.

The results of Example 4 described above are shown in FIG. 10.

By applying the DC voltage of 12 V, the dissolved-$Ca^{2+}$ concentration was reduced by 60%, that is, from 120 mg/L to 48 mg/L. This reduction is attributed to the deposition of the scale particles containing the Ca ions as a major component in the vicinity of the cathode 15. The aqueous solution in the vicinity of the cathode 15 was obtained to measure the pH. As a result, the pH was 11.2, and therefore the aqueous solution was strongly alkaline.

On the other hand, the results obtained in the case where oxygen gas dissolution by the ejector 20 was stopped are shown as Comparative Example 2. Performance of removal of $Ca^{2+}$ was as low as only 5% (dissolution performance: reduction from 120 to 114 mg/L). The aqueous solution in the vicinity of the cathode 15 was obtained to measure the pH. As a result, the pH was 7.2, and therefore the aqueous solution was substantially neutral.

Further, the amount of scale adhering to the cathode 15 per unit electrode area was measured after the scale deposition device 2 was continuously operated for 1,000 hours. Then, the amount of scale was 0.06 mg/cm$^2$ in Example 4, whereas the amount of adhering scale was 0.1 mg/cm$^2$ in Comparative Example 2.

REFERENCE SIGNS LIST

1 water heater main body, 2 scale deposition device, 3 scale capture means, 6 condenser (heat source), 9 heat-transfer channel, 10 inlet pipe for water to be heated, 11 heated-water outlet pipe, 12, 33 changeover valve, 13, 26 tank, 14, 27 anode, 15, 28 cathode, 16 first power supply, 18 water feed pipe, 20 ejector (oxygen-gas supplying/dissolving means), 24 return pipe (oxygen-gas supplying/dissolving means), 29 second power supply, 30 water outlet pipe, 31 partition plate, 32 scale removal pipe, 34 first air supply pipe, 35 separating membrane, 36 flow sensor (water-supply detection means), 134 second air supply pipe.

The invention claimed is:

1. A scale deposition system, comprising:
   a first tank;
   a scale deposition device including an anode and a cathode provided in the first tank so as to be opposed to each other, and a first power supply that applies a voltage between the anode and the cathode thereby depositing a scale component dissolved in water retained in the first tank;
   a second tank; and
   a scale capturing device including at least one pair of anodes and cathodes provided in the second tank, and a second power supply that applies a voltage between the at least one pair of anodes and cathodes to form an electric field between the at least one pair of anodes and cathodes in the second tank,
   wherein the scale deposition device includes an oxygen-gas supplying/dissolving unit supplying an oxygen gas to a water feed pipe for feeding the water to the first tank and dissolving the oxygen gas in the water, and
   wherein the second tank is connected to the first tank to receive the scale component in the water, the scale component being attracted to one of the anode or cathode of the at least one pair of anodes and cathodes in the second tank.

2. The scale deposition system according to claim 1, wherein the second tank includes a first pipe and a second pipe, and
   wherein the first pipe is connected to a water heater to convey the water, with the scale component removed, from the second tank to the water heater.

3. The scale deposition system according to claim 2, wherein the scale component removed is flushed out of the second tank via the second pipe.

4. The scale deposition system according to claim 2, wherein the first pipe is connected to a first valve and the second pipe is connected to a second valve,
   wherein the first valve is open and the second valve is closed to convey the water to the water heater, and
   wherein the second valve is open and the first valve is closed to convey the water out of the second tank via the second pipe.

5. The scale deposition system according to claim 2, wherein an opposite electric potential is applied by the second power supply to peel off scale particles from the one of the anode or cathode of the at least one pair of anodes and cathodes in the second tank, and
   wherein the scale particles are conveyed out of the second tank via the second pipe.

6. The scale deposition system according to claim 5, wherein the opposite electric potential is applied when a thickness of the scale particles on the at least one pair of anodes and cathodes in the second tank is 0.1 to 10 mm thick.

7. The scale deposition system according to claim 1, wherein a distance between the anode and cathode of the at least one pair of anodes and cathodes in the second tank is 0.15 to 10 mm, and
   wherein an electric field intensity between the at least one pair of anodes and cathodes in the second tank is 4 kV/cm or greater.

* * * * *